(12) United States Patent
Terasawa

(10) Patent No.: US 8,341,618 B2
(45) Date of Patent: Dec. 25, 2012

(54) INFORMATION PROCESSOR, SOFTWARE UPDATING SYSTEM, SOFTWARE UPDATING METHOD, AND ITS PROGRAM FOR UPDATING MODULES ON A USER COMPUTER

(76) Inventor: Yoichiro Terasawa, Tokyo (JP)

( * ) Notice: Subject to any disclaimer, the term of this patent is extended or adjusted under 35 U.S.C. 154(b) by 1800 days.

(21) Appl. No.: 10/563,123

(22) PCT Filed: May 19, 2004

(86) PCT No.: PCT/JP2004/006752
§ 371 (c)(1),
(2), (4) Date: Jan. 3, 2006

(87) PCT Pub. No.: WO2005/069135
PCT Pub. Date: Jul. 28, 2005

(65) Prior Publication Data
US 2006/0161640 A1  Jul. 20, 2006

(51) Int. Cl.
*G06F 9/44* (2006.01)
(52) U.S. Cl. ......... 717/172; 717/168; 717/169; 717/171
(58) Field of Classification Search ........... 717/168–178
See application file for complete search history.

(56) References Cited

U.S. PATENT DOCUMENTS

| | | | | |
|---|---|---|---|---|
| 5,586,304 A | * | 12/1996 | Stupek et al. | 717/170 |
| 5,809,287 A | * | 9/1998 | Stupek et al. | 703/22 |
| 5,835,911 A | * | 11/1998 | Nakagawa et al. | 1/1 |
| 5,960,189 A | * | 9/1999 | Stupek et al. | 717/169 |

(Continued)

FOREIGN PATENT DOCUMENTS

JP  63-109559 A  5/1988

(Continued)

OTHER PUBLICATIONS

Web page Technology of providing "virtual racks" for storing patch files (i.e. a package of RPM) obtained from any server storing patch files and Qwanty DB that registers license numbers where each of the numbers has a corresponding URL, then applies a patch automatically to an user server is disclosed in the printed copy of website first made public on the Internet as of Aug. 8, 2003, http://web.archive.org.web.20030808052157/http://www.gloc.net/engine/engine..., 2 sheets, Qloc. net (Oct. 2005).

(Continued)

*Primary Examiner* — Wei Zhen
*Assistant Examiner* — Qing Chen
(74) *Attorney, Agent, or Firm* — Rader, Fishman & Grauer PLLC

(57) ABSTRACT

Software is updated easily and efficiently and in the same time, thereby reducing the load imposed on the user side, the software vendor side and the center computer side. When the user computer sends user ID to the center computer, the center computer have the user computer obtain URL of the module-storing region that corresponds to the user ID and stores the modules that the user should obtain. The user computer accesses to the module storing portion using the URL, obtains a list of modules, compares the list to the modules that are currently installed in itself and judges whether it is necessary to obtain modules. When judged that modules are needed to be obtained, the user computer accesses to the module-storing region again and obtains the module.

18 Claims, 11 Drawing Sheets

U.S. PATENT DOCUMENTS

| | | | |
|---|---|---|---|
| 6,151,643 A * | 11/2000 | Cheng et al. | 710/36 |
| 6,457,076 B1 * | 9/2002 | Cheng et al. | 710/36 |
| 6,542,943 B2 * | 4/2003 | Cheng et al. | 710/36 |
| 6,557,054 B2 * | 4/2003 | Reisman | 710/33 |
| 6,763,403 B2 * | 7/2004 | Cheng et al. | 710/36 |
| 6,950,964 B1 * | 9/2005 | McMichael et al. | 714/38 |
| 7,051,325 B2 * | 5/2006 | Choi et al. | 717/168 |
| 7,093,246 B2 * | 8/2006 | Brown et al. | 717/173 |
| 2002/0120885 A1 * | 8/2002 | Choi et al. | 714/38 |
| 2002/0166001 A1 * | 11/2002 | Cheng et al. | 710/1 |
| 2002/0174422 A1 * | 11/2002 | Kelley et al. | 717/178 |
| 2003/0046675 A1 * | 3/2003 | Cheng et al. | 717/173 |
| 2003/0046676 A1 * | 3/2003 | Cheng et al. | 717/173 |
| 2004/0158829 A1 * | 8/2004 | Beresin et al. | 717/178 |

FOREIGN PATENT DOCUMENTS

| | | |
|---|---|---|
| JP | 63-126032 A | 5/1988 |
| JP | 64-018835 A | 1/1989 |
| JP | 06-250951 A | 9/1994 |
| JP | 07-129407 A | 5/1995 |
| JP | 09-128220 A | 5/1997 |
| JP | 10-091407 A | 4/1998 |
| JP | 10-091453 A | 4/1998 |
| JP | 10-171635 A | 6/1998 |
| JP | 10-301760 A | 11/1998 |
| JP | 11-095989 A | 4/1999 |
| JP | 11-265279 A | 9/1999 |
| JP | 11-272454 A | 10/1999 |
| JP | 2000-194541 A | 7/2000 |
| JP | 2000-194614 A | 7/2000 |
| JP | 2000-259519 A | 9/2000 |
| JP | 2000-285051 A | 10/2000 |
| JP | 2001-325107 A | 11/2001 |
| JP | 2001-325221 A | 11/2001 |
| JP | 2001-337835 A | 12/2001 |
| JP | 2002-007129 A | 1/2002 |
| JP | 2002-007333 A | 1/2002 |
| JP | 2002-189601 A | 7/2002 |
| JP | 2002-259128 A | 9/2002 |
| JP | 2002-318707 A | 10/2002 |
| JP | 2002-328865 A | 11/2002 |
| JP | 2002-373079 A | 12/2002 |
| JP | 2003-202988 A | 7/2003 |
| JP | 2003-223326 A | 8/2003 |
| JP | 2003-304458 A | 10/2003 |
| JP | 2004-102922 A | 4/2004 |

OTHER PUBLICATIONS

Web page "Technology of having a list showing URLs on the website for obtaining the latest version of individual software downloaded in a user computer displayed to a registered user who are provided with a designated area of Vector server at a "softwatch" page of MyVector is described in the printed copy of website first made public on the Internet as of Sep. 5, 2001" http://my.vector.co.jp/magazine/010905/sp01_01.html, 2 sheets, MyVector (Oct. 2005).

Information Materials An idea of storing a combination of patch files in a "virtual rack" after an operator checking on its performance before automatically applying thereof to the modules is disclosed in p. 4 and 5 of the printed copy of website first made public on the Internet as of Nov. 20, 2003, 13 sheets, Qwantly Corporation.

Megumi Nishimura, "RPM System Complete Strategic Guide", Linux Japan Magazine, Sep. 2001, pp. 23-39, vol. 4, No. 9, Japan.

* cited by examiner

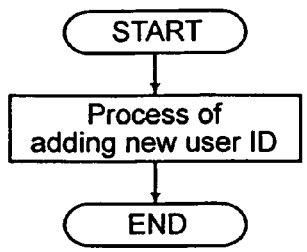
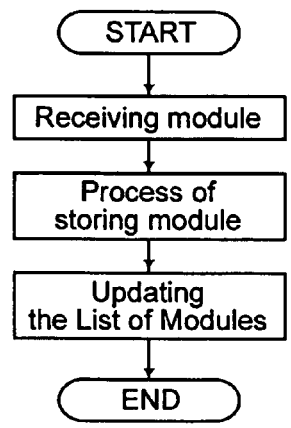
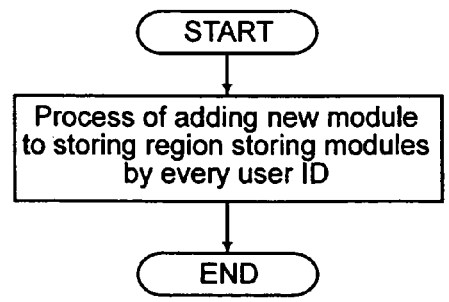
FIG.7A   FIG.7B   FIG.7C
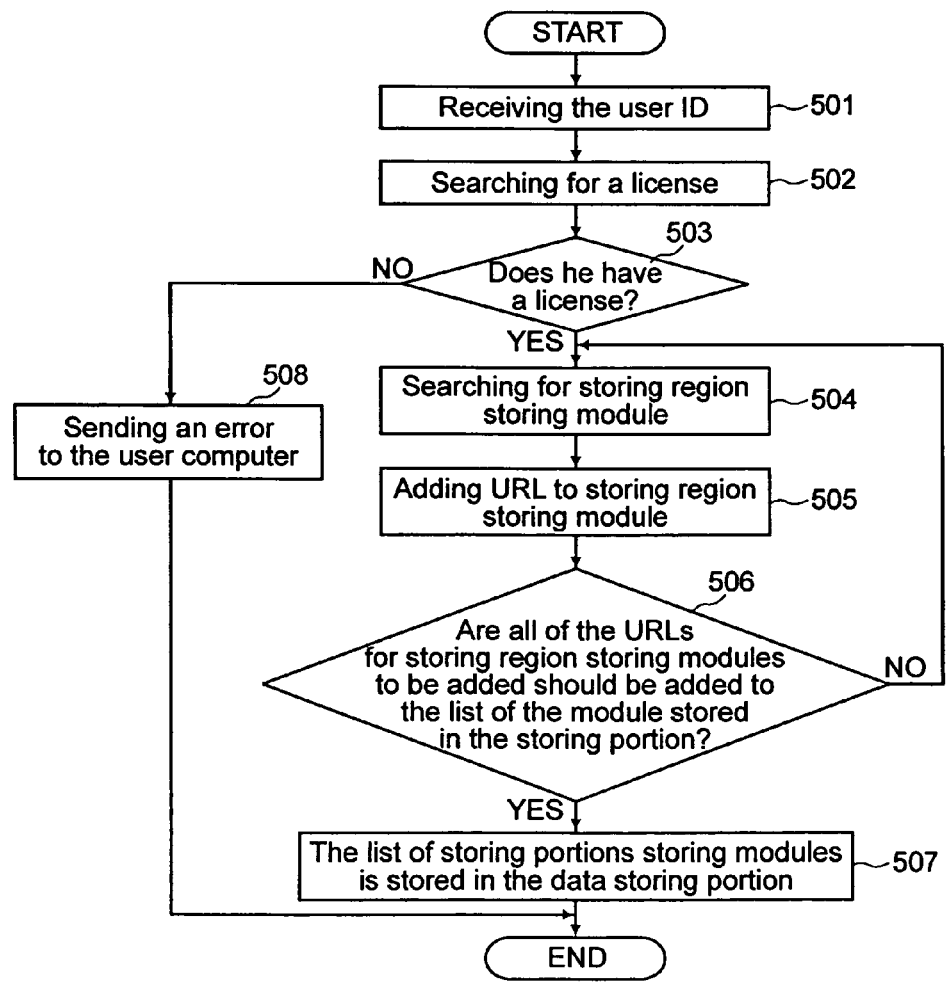
FIG.8

INFORMATION PROCESSOR, SOFTWARE UPDATING SYSTEM, SOFTWARE UPDATING METHOD, AND ITS PROGRAM FOR UPDATING MODULES ON A USER COMPUTER

FIELD OF TECHNOLOGY

The present invention relates to an information processing apparatus capable of updating software that is used by users, method of updating the software and program thereof.

BACKGROUND OF THE INVENTION

In a system that a computer of a user (user computer), a computer of a service provider (center computer) and a computer of a software vender (software vendor) are capable of communicating with each other, conventional technology for updating software of the user computer is, for example, that the center computer has a data base necessary for updating software installed in the user computer and the user installs data such as a part of the database. Then the user judges which of the update software to be obtained by exchanging data with the center computer. Having determined the software to be installed, the user receives information on URL (Uniform Resource Locator) of the software vendor from the center computer and using the information on URL, the user installs update software from a computer (site) of the software vendor.

[Patent Literature 1] Japanese laid-open patent application publication 10-91407 (paragraph [0027], [0028], [0029], [0030], [0031], [0032], [0033], [0034] and [0035], FIG. 2 and so on.

DISCLOSURE OF THE INVENTION

Problems to be Solved

However, in the technology recited in the patent literature 1 mentioned above, a large size database for maintaining information on software is necessary to be provided in the both of the center computer and the user computer.

Furthermore, even when the software is judged to be updated, the center computer simply informs the URL of the site of the software vendor where the update software is stored, which means that the center computer always has to check whether the URL of the software vendor still exists.

In addition, the center computer stores all of the information on various kinds of software installed in a plurality of user computers regardless of kinds of software actually installed in each user computer. Therefore, each of the user computers must obtain information on names of software that is actually installed therein from all of the information on various kinds of software first, every time when judging which software to be obtained. In other words, since the database of the center computer does not correspond to each of the user computer, each user computer has to choose information that is necessary for itself from the large amount of data.

Furthermore, at least five times of exchanging of data between the user computer and the center computer, namely, (1) synchronization of the tables installed in both computers, (2) sending and receiving of IDs for updating software, (3) returning information on IDs for updating software, (4) sending and receiving of records and (5) accessing to the site of the software vendors has to occur until the software is eventually updated in the user computer, which leads to congestion in network traffic and could become a cause for delay.

The present invention is made under such circumstance, and the object thereof is to provide an information processing apparatus capable of reducing load both of the software vendor side and the user side and updating software easily and, in the same time, efficiently, a system for updating software, method of updating software and the program thereof.

Means for Solving the Problem

In order to solve the above-mentioned problem, an information processing apparatus of the present invention comprises, sending means for sending a user identification information for identifying a user using the information processing apparatus to the center computer, first obtaining means for obtaining from the center computer a plurality of location information indicating locations of a plurality of storing regions that correspond to the user identification information sent by the sending means, out of a plurality of storing regions storing the plurality of update software for a plurality of software provided by a plurality of software vendors to the plurality of users such that the plurality of update software are made to correspond to the user identification information of each of a plurality of users, second obtaining means for obtaining a plurality of lists of the plurality of update software by accessing to the plurality of storing regions storing the plurality of update software according to the plurality of location information obtained by the first obtaining means; judging means for judging whether there is any update software to be obtained by comparing the obtained list and the software currently being installed in the information processing apparatus, and third obtaining means, when the judging means judges that there are some update software to be obtained, for obtaining the update software by accessing to each of the storing regions storing the update software for each of the software judged to be updated according to each of the obtained location information.

Here, the storing region storing update software may be located at any place in the network as long as the storing region is capable of communicating with the above-mentioned center computer and the user computer. In addition, the location information on the storing region storing update software is, for example, a URL (Uniform resource Locator).

According to this configuration, since the storing region storing the update software corresponds to the user identification information (User ID) of the user computer, the user computer is only to obtain location information on the storing region storing update software from the center computer. Then the user computer obtains the update software easily and precisely without relying on the center computer by obtaining the list of update software stored in the storing region storing update software according to the location information, judging the necessity of obtaining updates, and accessing to the storing region storing update software.

In addition, the exchange of information with the center computer is limited to the sending of a User ID and corresponding location information and, since the storing region storing update software does not correspond to each user of the information processing apparatus, traffic congestion or delay in the network can be minimized.

Furthermore, the whole process of obtaining update software, starting from judging the necessity for update until obtaining the necessary updates can be automated.

According to the information processing apparatus described as above, the update software are modules for updating software currently being installed in a plurality of the information processing apparatuses of the plurality of users that are made to correspond to the plurality of storing regions storing the update software, and the judging means has means for comparing the list of modules obtained from the storing regions storing the update software and the modules that are currently being installed in the information processing apparatus and forming a list of newer versions of the modules than the modules currently being installed in the information processing apparatus out of the list of modules obtained from the storing regions storing the update software and means for presenting the formed list to the user and inputting a command to obtain the newer version of the modules, and the second obtaining means may obtain the newer version of the modules when the command to obtain the newer version thereof is inputted.

In addition, according to the information processing apparatus described as above, the update software are modules for currently not being installed and to be added in the information processing apparatus of the plurality of users that are made to correspond to the storing regions storing the update software and, the judging means has means for comparing the list of modules obtained from the storing regions storing the update software and the modules that are currently being installed in the information processing apparatus, and forming a list of modules that are currently not being installed in the information processing apparatus and means for presenting the formed list to the users and inputting a command to obtain the modules currently not being installed and, the second obtaining means obtains the modules currently not being installed in the information processing apparatus when the command to obtain the modules currently not being installed is inputted.

Here, "inputting the command to obtain the modules" includes not only when, for example, the user presses "obtain" button shown on the screen as GUI (Graphical User Interface) such as an icon but also when a timer reaches its set hours to obtain modules after the user set the timer.

With this configuration, the necessity of the software to be updated can be informed easily to the user by presenting the list of new versions of modules and the list of deficient modules. Furthermore, since the new versions of modules and deficient modules are obtained according to the "obtain" command described as above, the software can be prevented from being updated against the intention of the user.

According to the information processing apparatus described as above, the information processing apparatus further comprises means for accessing to the storing regions storing update software and obtains a list of modules again by-accessing to the storing regions storing the update software according to the obtained location information when the command to obtain the modules is inputted and means for re-forming the list of the newer version of modules according to the list obtained again, and the second obtaining means may obtain the newer version of the modules according to the re-formed list of modules.

According to this configuration, since—the list of modules to be obtained is formed again by accessing to the software storing region after the transmission of the command to obtain the modules, for example, the update software added to the software storing region by the time the user transmits "obtain" command can be obtained. This enables real-time and complete update of the software.

Meanwhile, as the information processing apparatus updates the software, there may be a case where the updated software has an effect on other software used by the user causing the unstable performance of the other software. In such a case, it is difficult for a user who does not have knowledge of an expert to previously judge or foresee such effects and to stop updating his/her software when the update software does have a harmful effect on the existing software.

For this reason, the information processing apparatus described above further comprises, means for previously storing a name of the software that is being excluded from the judgment of judging whether there are any update software to be obtained and means for restricting updating software according to the stored names of the software.

Here, "a name of the software that is being excluded from the judgment of judging" means, for example, software that may have a harmful effect. With this configuration, the user can update his/her software without worrying the effect that the update software may have on the other software of his/her own. Even when there is update software that will have harmful effect, the updating such software may be restricted beforehand.

The information processing apparatus as described above is capable of communicating with a link machine as a master machine through the network and has means for having the link machine compare the list of modules of the update software obtained from the storing regions and the modules that is currently being installed in the information processing apparatus and judge whether there are any update software to be obtained, and when there are some update software judged to be obtained, access to storing region for each of the software judged to be obtained according to each of the obtained location information and obtain the necessary update software from the storing regions storing the update software.

Here, apart from a small-scale network such as LAN, the network includes, for example, WAN (Wide Area Network), the Internet and the like.

With this configuration, software installed in all the other link machines can be updated at once as the information processing apparatus triggers the action to obtain update software to the other link machines when being connected thereto. In addition, the information processing apparatus becomes a trigger for updating the link machines but the information processing apparatus does not send the update software itself to the link machines, the load on the information processing apparatus can be minimized.

A system for updating software of present invention in a system where a center computer and an information processing apparatus of a user is capable of communicating through a network, the center computer has means for previously putting away update software for a plurality of software provided to a plurality of users by a plurality of software vendors in a plurality of storing regions storing a plurality of update software that are provided on the network so that each of the storing regions corresponds to each of a plurality of location information indicating a location of each of the plurality of storing regions for each of the update software and a plurality of user identification information of each of the plurality of users, a receiving means for receiving the user identification information from the information processing apparatus and referencing means for having the information processing apparatus refer to the location information of the storing regions for update software that corresponds to the user identification information when the user identification information is received by the referencing means, and the information processing apparatus of the user has sending means for sending the user identification information to the center computer, a first obtaining means for obtaining a plurality of location information indicating locations of a plurality of storing regions that corresponds to the user identification information sent by the sending means, second obtaining means for obtaining a plurality of lists of the plurality of update software by accessing to the plurality of storing regions storing the plurality of update software according to the plurality of location information obtained by the first obtaining means, judging means for judging whether there is any update software to be obtained by comparing the obtained list and the software currently being installed in the information processing apparatus and third obtaining means, when the judging means judges that there are some update software to be obtained, for obtaining the update software by accessing to each of the storing regions storing the update software for each of the software judged to be updated according to each of the obtained location information.

With such configuration, the center computer is only to have the User IDs correspond to the location information of the storing regions and is not necessary to maintain information on update software for each one of the users. This leads to reducing of maintenance and communication load imposed in the whole system to a considerable extent.

In addition, the information processing apparatus on the user side also only has to send its User ID to obtain the location information of the storing regions storing the update software necessary for updating software installed therein. Therefore, the information processing apparatus can have its software updated easily by accessing to the storing regions without relying on processing by the center computer.

Furthermore, the software vendor is only to have the center computer put the update software in the storing region storing update software, then the update software is provided to the user easily by the processing of the center computer and the information processing apparatus on the user side.

In addition, the exchange of information between the center computer and the information processing apparatus on the user side and between the information apparatus and the storing region can be finished with a minimum number of once or two times respectively, traffic congestion or delay in the network can be prevented at a minimum rate.

In other words, the software of the user can be updated easily and efficiently and the load imposed on the center computer, the information processing apparatus on the user side and the software vendor can be reduced in the same time.

According to the system for updating software described above, the center computer may have means for receiving update software from the software vendor, add the software to the storing region storing update software and have the list of update software stored in the storing region storing the update software renewed.

With such system, every time the software vendor sends the update software they provide to the center computer, the center computer, without fail, adds the update software into the storing region storing update software and renews the list of update software, the center computer and the software vendor can always provide the user with the current update software.

According to the system for updating software described above, the center computer may further have a predetermined means for noticing the information processing apparatus on the user side when new update software is added to the storing region storing update software.

Here, the predetermined means for informing is, for example, a notice sent via e-mail. This configuration enables the user to know immediately of the current update software provided by the software vendors and to update the software upon the receipt of the above-mentioned notice.

According to the system for updating software described above, the plurality of storing regions storing the update software are provided for each of the plurality of software vendors and the means for putting the plurality of update software to the plurality of storing regions for update software by each of a plurality of different software provided by each of the plurality of software vendors so that each of the plurality of software updates corresponds each of the plurality of location information for each of the update software, each of the plurality of user identification information and the first obtaining means may obtain each of the location information for each of the software storing regions storing update software corresponding to the user identification information, and the second obtaining means and the third obtaining means may access to each of the plurality of storing regions storing update software according to each of the plurality of location information.

With this configuration, in a case where the software vendor provides a plurality of different software, the maintenance of the update software becomes easier by having each of the software stored individually into each of the storing regions storing update software. In the same time, since the plurality of storing regions storing update software corresponds with user ID of the information processing apparatus on the user side, the software can be updated quite easily without any complicated process so long as the location information of the storing region storing update software is received.

According to the system for updating software described above, the means for previously putting the plurality of update software in the plurality of storing regions storing update software so that a combination or a plurality of combinations out of the different software provided by the plurality of software vendors may correspond to the plurality of location information of each of the plurality of storing regions for each of the update software and the user identification information of each of the plurality of users.

With this configuration, even when the user is using different software provided by a plurality of different software vendors, the different software are all stored as a group of software in the storing region storing the update software. Therefore, the information processing apparatus on the user side can obtain update software necessary to its own at once by accessing to the storing region storing update software.

A method of updating a software installed in an information processing apparatus capable of communication with a center computer through a network of the present invention comprises, sending an user identification information for identifying an user using the information processing apparatus to the center computer, obtaining from the center computer a plurality of location information indicating locations of a plurality of storing regions that correspond to the user identification information sent by the sending means, out of a plurality of storing regions storing the plurality of update software for a plurality of software provided by a plurality of software vendors to the plurality of users such that the plurality of update software are made to correspond to the user identification information of each of a plurality of users, accessing to the plurality of storing regions for update software according to the received plurality of location information and obtaining a plurality of lists of software to be updated from the plurality of storing regions storing update software, judging whether there are any update software to be obtained by comparing the list of the update software and the software currently being installed in the information processing apparatus, and obtaining necessary update software from the storing regions storing update software for each of the software judged to be obtained by accessing to each of the storing regions storing update software according to the location information when there is an update software judged to be obtained.

Meanwhile, a program for causing an information processing apparatus capable of communicating with a center computer through a network to execute a processing comprises, a sending step for sending an user identification information for identifying an user using the information processing apparatus to the center computer, an obtaining step for obtaining from the center computer a plurality of location information indicating locations of a plurality of storing regions that correspond to the user identification information sent by the sending means, out of a plurality of storing regions storing the plurality of update software for a plurality of software provided by a plurality of software vendors to the plurality of users such that the plurality of update software are made to correspond to the user identification information of each of a plurality of users, an accessing step for accessing to the plurality of storing regions for update software according to the received plurality of location information and obtaining a plurality of lists of software to be updated from the plurality of storing regions storing update software, a judging step for judging whether there are any update software to be obtained by comparing the list of the update software and the software currently being installed in the information processing apparatus, and an obtaining step for obtaining necessary update software from the storing regions storing update software for each of the software judged to be obtained by accessing to each of the storing regions storing update software according to the location information when there is an update software judged to be obtained.

BEST MODE OF CARRYING OUT THE INVENTION

Embodiments of the present invention is explained as below.

FIG. 1 is a sectional view showing overall structure of a container according to an embodiment of the present invention.

As shown in the diagram, for example, network 101 such as Internet and LAN (Local Area Network), center computer 102, a plurality of user computers 103 and a plurality of module-storing regions 104 that stores modules as software updates are connected. The center computer 102, the user computers 103 and the module-storing regions 104 are capable of communicating with each other through the Internet.

The number of the user computers 103 and the module-storing regions 104 can be anything so long as they are capable of being connected with the center computer 102. In addition, a topology that the user computers 103 is connected with the center computer 102 and the module-storing regions 104 may be, for example, company LAN being connected to the Internet. The form of connection may also be a computer of a remote branch office or a computer of a company run by a private individual and the like working so called as SOHO (Small Office/Home Office) connected to a computer in the head office through the Internet.

FIG. 2 is a diagram showing a structure of the center computer 102.

The center computer 102 is comprised of a CPU (Central Processing Unit) 201, a communication portion 204 for communication through the network 101 and a data storing portion 205 that stores various kinds of data and the like all connected with each other through a bus 206.

The data storing portion 205 stores a licensing table 205a, a table for locating modules to be obtained 205b and the table for information on the module-storing region 205c.

FIG. 3 is a diagram showing the contents of the licensing table 205a, the table for locating modules to be obtained 205b and the table for information on the module-storing region 205c.

As shown in FIG. 3, the licensing table 205a stores license information such as user ID of the individual user for identifying user of each of the user computers, an IP address and a domain name as a unique key for the individual user. The licensing table 205a exists in the same number as the number of the user computers 103.

The table for locating modules to be obtained 205b contains user ID and URL indicating location of the module-storing regions 104 on the network 101 that corresponds with the user ID. Since the module-storing regions 104 exists in a plurality of numbers and the plurality of storing regions can be made to correspond to a single user ID, the user ID is regarded as a duplicatable key in the table. This means that a plurality of URLs for different module-storing regions 104 may be stored as being made to correspond to the same user ID.

Further, regarding the table for locating modules to be obtained 205b, the table exists in the same number as the number of different module-storing regions 104 that are made to correspond with the same user ID. The table is provided for each one of the plurality of the user IDs. Details of the module-storing regions 104 will be described later.

In the table for information on the module-storing region 205c, URLs and types of the module-storing regions 104 and an unlocking keys are stored as unique keys.

The type of the module-storing region 104 indicates what types of modules that the module-storing region 104 should store. In other words, types of modules indicate whether the module-storing region 104 stores the latest version of modules that are the modules being made some changed to the current version of modules (hereinafter called as "the changed modules") or the modules that are to be added to the current version of modules without changing the current modules (hereinafter called "the added modules"), or whether the module-storing region 104 is made to correspond to a region storing modules called a "skip module" which will be described later. In addition, the unlocking key is a key that unlocks the module-storing region 104 when the user computer 103 accesses the storing region in a case where the region is locked.

The table for information on the module-storing region 205c exists in the same number as the number of the module-storing regions 104 that are connected to the center computer 102.

The licensing table 205a and table for locating modules to be obtained 205b are made to relate with each other with the user IDs. The table for locating modules to be obtained 205b and the table for information on the module-storing region 205c are made to relate with each other with the URLs for module-storing regions. Consequently, all of the three tables are made to relate with each other. Further, the user computer 103 is able to obtain URLs for each of the module-storing regions 104, types of module-storing regions 104 and the unlocking keys by referring to the table for locating modules to be obtained 205b and table for information on the module-storing region 205c.

In addition, though not shown in the diagram, the center computer may have data such as the name of each software vendors and the name of each software apart from the data stored in the above-mentioned three tables.

FIG. 4 is a diagram showing a structure of the module-storing region 104.

As indicated in the diagram, a plurality of module-storing regions 104-1, 104-2 and 104-3 are connected to the network 101. Each of the module-storing regions 104 is divided into several sections indicated as 104-1b, 104-2a, 104-2b and the like. Furthermore, as described above, the number of the module storing portion 104 is not limited to three as indicated in the diagram.

Modules 302a, 302b etc for updating software sent to the center computer 102 by the software vendors are stored in each of the module-storing regions 104. Meanwhile, a list of modules 301 is stored in the center computer 102. The modules 302 may be, for example, patches for the security hole. Name of the modules and the version information on the modules are written in the above-mentioned list of modules 301. Furthermore, as described above, each of the regions are categorized according to its types, namely, regions for storing the changed modules or regions for storing the added modules. The region is also categorized according to types on whether or not it corresponds to the region of skipped modules that will be described later.

As a mode of utilizing each of the module-storing regions 104, modules may be stored in such order that modules for the software provided by a software vendor A is stored in the region 104-1a and modules for the software provided by a software vendor B is stored in the region 104-1b.

In addition, in a case where one software vendor provides a plurality of different types of software, for example, the software vendor A provides three different software A, B and C, the software vendor B provides two different software D and E, each module of different software may be stored such that 104-1a of the module-storing region 104-1 stores module of the software A provided by the software vendor A, the region 104-1b of the software vendor B stores modules of the software D. The region 104-2a of the module-storing region 104-2 may store module of software B the region 104-2b may store module of software E, region 104-3a of the module-storing region 104-3 may store module of software C. In other words, modules can be stored for each of the different software provided by each of the software vendors. In this configuration, each of the software vendors is able to use different module-storing regions 104, for example, for its OS (Operating System) and application software, or different regions can be used for each of the plurality of application software.

Moreover, in a case where one user uses software A among the software A, B and C provided by the software vendor A, another user uses software A and B and yet other user uses all of the software A, B and C, for example, modules may be stored for every combination of the software of the users, namely, module for the software A may be stored in the region 104-1a, module for the software A and B may be stored in the region 104-1b and the module for the software A, B and C may be stored in the region 104-3a.

Furthermore, even for the modules of the software that are not of the software vendors, for example, in a case where one user uses software A provided by the software vendor A and software D provided by the software vendor B and software G provided by the software vendor C, the software A, D and G provided by different software vendors can be stored in the same storing region, according to the combination of the software used by the user.

This facilitates maintenance of the software for each of the users and the user computer 103 can obtain modules to be updated that correspond to its combination of software at once by accessing to the module-storing region 104.

For any mode of utilization mentioned above, each of the module-storing regions 104 is allocated with an URL of the module-storing region 104 and made to correspond to the user Ds. Each of the software vendors, when providing new modules to be updated for the software that they offer, for example, sends modules out to the center computer 102 and the center computer 102 designates the module-storing region 104 for the modules to be stored, for example, by having them relate by the names of the software and the like. The module is stored in the designated module-storing region 104 and in the same time, the module list 301 is also updated.

However, the software vendor may add the modules to be changed directly to the module-storing region 104 without intervention of the center computer 102. In such case, the module-storing region may be set to automatically update the module list 301 when a new module is stored in the module-storing region 104.

Furthermore, the module-storing region 104 may take a form that the center computer side leases to the software vendors. The software vendors can use the module-storing region 104 during the leasing period set by a lease contract with the center computer side.

FIG. 5 is a diagram showing a structure of the user computer 103. In the diagram, the user computer 103a, 103b and 103c forming a network as being connected to, for example, LAN 101 in a company. The number of user computers that forms the network is not limited to this particular number, however, any number of computers can be connected thereto so long as they are capable of communicating with each other.

Further, in the diagram, each of the user computers 103 are so-called a server-type computer, and offers its own function and data to a number of client computers connected to LAN 101 (not shown). Updating of the software for each of the user computers is supposed to be managed by, for example, a system manager that manages computer system inside the company.

As indicated in the diagram, the user computer 103a is comprised of CPU 401, communication portion 404 and software-storing portion 407 and they are all connected with a bus 409.

FIG. 6 is a diagram showing a structure of the software stored in the software-storing portion 407 and detailed structure of the data storing portion 408.

As shown in FIG. 6A, the software-storing portion stores OS 411, update support tool 410 for updating software installed in the user computer 103 in the present embodiment and software of various kinds of application program (AP) 409a, 409b and 409c. The OS 411 and the application programs 409 are comprised of a plurality of modules that are subject to being updated. Further, API (Application Program Interface) 412 is built into OS 411 as a common interface so that various data can be exchanged between the user computer 103a and user computer 103b, 103c and any other user computers 103.

In addition, as shown in FIG. 6B, an IP address of the user computer 103a, user ID for being connected with the center computer 102, names of skipped modules and IP address of the link machine are stored in the data storing portion 408.

The name of skipped module is a name of a module that, when obtained, might have effect on the operation of other software. The user computer 103a can cancel the obtaining of the skipped module by referring to the names thereof. Details of the canceling process will be described later.

The IP address of the link machine is address of the other user computers 103b and 103c and the like. The user computer 103a that functions as a master machine needs the IP address of the link machine in order to have the other user computers 103b and 103c start up linking with the master machine and obtain the modules to be updated. This process of start up linking with the user computer will also be described later.

In addition, as shown in FIG. 5, operating portion 405 and a monitor 406 is connected to the user computer 103a. The operating portion 405 is structured, for example, by a key boards, mouse, a touch pad and the like. The operating portion 405 functions as a user interface when the system operator installs software to be updated using the update support tool 410 and inputs various kinds of data in a set-up operation. Further, the update support tool 410 displays an update operation managing screen (not shown) on the monitor 406 when installing the modules to be updated or, in the set-up operation, the system manager performs various kinds of operation process on the screen using the operating portion 405. In addition, the operating portion 405 and the monitor 406 may locate at a position physically away from the user computer 103a and other user computers so long as they are connected with each other.

Next, an operation that the user computer 103 obtains modules as update software in the system structured as above is explained. The operation is explained in a case where updating software of each of the user computers 103 that the system operator formed into a LAN inside a company, as shown in FIG. 5 and FIG. 6.

First of all, operation of the center computer 102 in the embodiment of the present invention is explained. FIG. 7 is a flow chart showing a process necessary for the center computer 102 to update the software.

FIG. 7A is a diagram showing a process of registering a new user in a center computer 102 for updating software of each of the user computers 103 with the installation of update support tool 410. In this case, the center computer 102 provides the system operator with a user ID for identifying him/her, and adds or updates data in each of the licensing table 205a, table 205b for locating modules to be obtained and table 205c for information on the module-storing region 104.

FIG. 7B is a flow chart showing a sequence of an action of the center computer 102 when it receives new modules for updating software from the software vendor. As shown in the diagram, the center computer 102, when it receives the new modules from the software vendors, the center computer 102 designates the module-storing regions 104 for the modules to be stored, for example, by having them relate by the names of the software and the like that received from the software vendors. The module is stored in the designated module-storing region 104 and the module list stored in the region is updated in the same time.

Additionally, as explained above, each of the software vendors may access directly to the module-storing regions 104 to add the modules.

FIG. 7C is a flow chart showing a sequence of an action of the user computer 103 when it is added with new software. When the user computer 103 is added with the new software, the center computer 102 sets a new storing region 104 for storing modules for updating the software and stores the URL of the region into each of the table 205a, 205b and 205c in a manner to correspond to the user ID of the user computer 103 that is added with the new software.

FIG. 8 is a flow chart showing a sequence of an action of the center computer 102 when the user computers 103 update the software.

As shown in the diagram, first of all, the center computer 102 receives user ID from the user computer 103 for identifying the user computer (Step 501). The center computer 102 judges whether the user computer 103 has a license or not by referring to the license table 205a (Step 502). When judged that there is no license ("NO" in Step 503), the center computer 102 sends an error message to the user computer 103 (Step 508).

When judged that there is a license ("YES" in Step 503), the center computer 103 searches for module-storing regions 104 that correspond to the user ID by referring to the table 205b for locating modules to be obtained (Step 504). Then the center computer 102 lists up the module-storing regions 104 that corresponds to the user ID and adds URL of the module-storing regions 104 to the list (Step 505). This adding process is repeated for a number of times as the number of module-storing regions 104 that correspond to the user ID ("NO" in the Step 506). When URLs for all of the corresponding modules are added ("YES" in Step 506), the list is stored in the data storing portion 205 so that the user computer 103 is capable of referring thereto (Step 507). In other words, the center computer 102 stores the list of the module-storing regions 104 into the data storing portion 205 so that the user computer 103 that accesses the data storing portion 205 can obtain the list of the module-storing region 104. Further, the list of module-storing regions includes information on types of module-storing regions and unlocking key for unlocking the module-storing region 104 in a case it is locked.

Next, operation of the user computer 103a is explained. FIG. 9, FIG. 10, FIG. 11, FIG. 12 and FIG. 13 are flow charts showing a sequence of an action necessary for the user computer 103a to update its software.

As shown in FIG. 9, the update support tool 410 of the user computer 103a, when it is started up, first of all, judges the purpose for being started up (Step 601). When it is started up for the purpose of checking for the modules to be updated (Step 601), the update support tool 410, for example, makes update operation managing screen to be displayed and have the system manager operate the operating portion 405 and send its own user ID to the center computer 102 through the network 101 (Step 602). In addition, in the case where the user computer 103 is not started up for the purpose of checking for the modules to be updated in Step 601 is explained in the flow chart [1] of FIG. 13.

Then the user computer 103 receives a status as a result of sending the user ID from the center computer 102 (Step 603). In a case such that the user computer 103a is not licensed, which means when the status is "error", the update support tool 410 sends the error status to the API412 (Step 605).

When the status is not "error" (Step 604), the process proceeds to the flow chart [2] and the update support tool 410 judges whether there were any link machines that are to be started up linking with the user computer 103a.

Additionally, a link machine to be started up linking with the user computer 103a is previously set by inputting the IP address and the like of such user computers using the screen displayed by the software support tool 410. The set data is stored in the data storing portion 408 as an IP address of the link machine. Judgment to whether there are any link machines to be started up linking with the user computer 103a is made by checking on whether the user computer is capable of communicating with the IP address written as the IP address of the link machines.

When there is a link machine that starts up linking with the user computer 103a ("YES" in Step 606), the update support tool 410 sends out a start up message to the link machines, in other words, a message to have the link machines obtain the module from the module-storing region 104 as in the user computer 103a (Step 607). The sending out of the message is repeated to all of the link machines that are started up linking with the user computer 103a ("NO" in Step 608) and when the start up message is sent to all of the link machines ("YES" in Step 608) the process of the update support tool 410 proceeds to flow chart [3] of FIG. 10. Meanwhile, when there are no link machines to be started up linking with the user computer 103a ("NO" in Step 606), the process of the update support tool 410 simply proceeds to [3] in flow chart.

Then as shown in flow chart [3] of FIG. 10, the update support tool 410 accesses to the center computer 102 through the network 101, and obtains the list of module-storing regions 104 by referring to the data storing portion 205 (Step 609). After that, the user computer 103a accesses to the module-storing regions 104 by referring to the URL of the module-storing region 104 contained in the received list of module-storing region. When the module-storing region 104 is locked at the time of the access ("YES" in Step 611), the update support tool 410 unlocks the lock using the unlocking keys contained in the list of module-storing regions 104 (Step 612) and obtains the module list 301 stored in the module-storing region 104. When it is not locked, the module list 301 is simply obtained.

Next, the update support tool 410 judges whether or not the module list 301 of the obtained module-storing region 104 corresponds to the skipped module based on the information on types (Step 614). The region corresponding to the skipped module means, in concrete, whether or not installation of the modules can be cancelled based on the name of the skipped module stored in the data storing portion 408. When the module-storing region 104 corresponds to the skipped module, the user computer 103a cancels the obtaining of the skipped modules. After the obtaining of the skipped module is cancelled, for example, when the software vendors confirmed that the module has no problems as a result of the performed operation check, the user computer 103a can obtain the cancelled module as the software vendor stores module to other module-storing regions 104.

When the region corresponds to the skipped module ("YES" in Step 614), the skipped module is deleted from the obtained module list 301 (Step 615). Meanwhile, when the region does not correspond to the skipped module, the update support tool 410 judges whether the type of module-storing region 104 is for added modules or for changed modules based on the information on types of modules (Step 616). When the type of region is for added modules ("YES" in Step 616), the modules mentioned in the module list 301 is added to the list of added modules (Step 618). When the type of region is for changed modules ("NO" in Step 616), the module is added to the list of changed modules (Step 617). Then the process is repeated until the update support tool 410 accesses to all of the module-storing regions 104 mentioned on the list of module-storing regions 104 ("NO" in Step 619) and when it accesses to all of the regions ("YES" in Step 619), the process is proceeded to flow chart [4] of FIG. 11.

Meanwhile, in the embodiment of the present invention, when the list of modules and modules currently being installed in the user computer 103a is compared, a list of new version of modules (version that is changed) is called a list of changed modules to be obtained, and a list of modules not currently installed in the user computer 103a is called a list of added modules to be obtained.

As shown in the flow chart [4] of FIG. 11, first of all, the update support tool 410 judges whether or not there is already a list of changed modules to be obtained in the user computer 103a (Step 620). In a case where there is a list of changed modules to be obtained means that a list used when the update support tool 410 changed the modules in the past still remained. When there exist the list ("YES" in Step 620), the list is initialized (Step 621) and when there is no such list, the list of changed modules to be obtained is newly formed (Step 622).

Similarly, when there is already a list for the added modules to be obtained ("YES" in Step 623), the list is initialized (Step 624) and when there is no such list, the list of added modules to be obtained is newly formed (Step 625).

Namely, when a module newer than the modules in the user computer 103a is on the list of changed modules ("YES" in Step 626), the name of such modules is added to the list of changed modules to be obtained (Step 627). When a module on the list of added modules does not exist in the user computer 103a ("YES" in Step 628), the module is added to the list of added modules to be obtained (Step 629).

The operation described above is performed for all of the modules mentioned in the list of changed modules and the list of added modules. When both of the list of changed modules to be obtained and the list of added modules to be obtained are completed, the update support tool 410 proceeds to flow chart [5] of FIG. 12 after sending a status to API 412 that there is modules that the user computer 103a should obtain (Step 630). However, when there are no modules needs to be obtained, the update support tool 410 sends out such status to the API 412 and displays as such on the monitor 406.

Next, as shown in the flow chart [5] of FIG. 12, the update support tool 410 cause the list of changed modules to be obtained or list of added modules to be obtained displayed on the monitor 406 (Step 631) and have the system operator choose among the choices of obtaining the modules immediately setting a timer for obtaining the modules" or "not obtaining the updates at all" using, for example, a GUI buttons and the like.

In a case where the timer is set, the update support tool 410 have the monitor 406 display a screen for setting the timer and have the system operator inputs date and time. When the system operator chooses "obtaining the modules immediately" or when the hours reached to the date and time set for the timer ("YES" in Step 634), the update support tool 410 accesses to the module-storing region that stores the changed modules to be obtained based on the list of changed modules to be obtained, using the URL of such module-storing regions (Step 635) and updates the modules (Step 636). The update support tool 410 also accesses to the module-storing region 104 that stores added modules to be obtained based on the list of added modules to be obtained (Step 638) and obtains such added modules to be obtained and install the obtained modules (Step 639). Then, as the update support tool 410 sends status that the obtaining the modules are completed to the API (Step 639), the update module obtaining process of the user computer 103a is completed.

Further, when the update support tool 410 sends message to start up other user computers linking with the user computer 103a, the other user computers do not obtain the modules from the user computer 103a but obtains the module by accessing to the modules storing regions 104 by themselves in the same way as the user computer 103a while the user computer 103a playing a role as a trigger. Therefore, the load on the user computer 103a as a master machine can be minimized compared to the case where the user computer 103a sending the modules obtained to each of the other link machines.

Meanwhile, as in Step 601 in FIG. 9, in a case where the update support tool being started up for reasons other than checking for the modules need to be obtained means, as shown in FIG. 13, for example, when the user computer 103a itself is started up based on the message from the user computers 103b and 103c to start up linking with the user computers 103*b* and 103*c*. In such case, the user computer 103*a* repeats the process indicated in the flow chart as [3], [4] and [5].

With this configuration, the user computer 103*a* is able to play a role as a trigger and have the other user computers 103*b*, 103*c* etc started up linking with the user computer 103*a*. In the same time, the user computer 103*a* is able to receive the message to start up linking from the other user computers linked as a link machine and obtain the modules in the same way as the other user computers do.

As explained above, according to the present invention, the center computer 102 is only to maintain the module-storing regions 104 according to the user IDs and the URLs of the module-storing regions 104 and inform the user computer 103*a* of their URLs to have the software installed in the user computer 103*a* updated quite easily. Also, the user computer 103*a* is only to send out the user ID to the center computer to obtain the location information of the module-storing regions 104 that stores modules to be obtained, therefore, is able to update its installed software quite easily without relying on the process of the center computer 102.

Furthermore, the software vendors are only to rely on the center computer 102 to have their modules stored in the module-storing regions 104. Then the update modules can be provided to the users quite easily by the process of the center computer 102 and the user computer 103*a*.

In addition, the exchange of data between the center computer 102 and the user computer 103, the user computer 103 and the module-storing regions 104 can be limited as the lowest number of times as possible, namely, once or twice respectively, traffic congestions or delays in the network can be minimized.

However, the embodiments of the present invention is not limited to the embodiments described above but can be varied within the scope of the present invention.

For example, in the embodiments described above, the user (system operator) himself starts up the update support tool 410, however, the update support tool may be started up automatically on a regular basis by setting a timer. Also, for example, the center computer 102 may cause the update support tool 410 to start up.

Furthermore, in the above described embodiments, the center computer 102 may send a message to inform the user computer 103 every time modules are added to the module-storing regions 104 and the update support tool 410 may be started up on receiving the message.

Additionally, in the above described embodiment, an example of listing a name of modules as "skipped modules" presuming that there may be a case where there are modules that have a negative effect on the other software installed by the user, namely, the operation of the other software become unstable, is listed up as skipped modules in the data storing portion 408 and canceling the installation of such modules based on the names of the skipped modules has been explained. However, it is very difficult for the vendors to predict every module that may have negative effect on other software and there may be a case where installation of modules causing a negative effect on the other software used by the user even for the modules that are not listed as "skipped modules".

For this reason, the system according to the present invention may possess a function to put the software back to a state before being updated.

In other words, before the user computer 103 obtains the modules, information on previous version of the module and the information on URL of the storing region of the module is previously stored, and in a case where such problem occurred after the obtaining, the previous version of the module can be obtained as a new module to be updated based on the stored information.

Since the update support tool 410 stores history information of access to the module-storing region 104 last time when it obtained a module, the information on the version of the modules of the software that currently being used and the URL of storing regions of the modules can be stored based on the information. By storing such information before updating the software, the software can be restored to its previous state even after updating thereof by obtaining the previous version of modules based on the information. Furthermore, the operation for this case may be in such form that providing a button shown as a GUI on the monitor 406 for "restoring to a state before the update" command and the user presses down the button by the operating portion 405.

In addition, in the embodiment described above, the user chooses on the monitor 406 among the choices of obtaining the modules immediately", "setting a timer for obtaining the modules" or "not obtaining the updates at all" after the list of changed modules to be obtained or the list of added modules to be obtained is being made. However, since the module-storing region 104 may be added with new modules of all kinds of software vendors any time, for example, when user sets a timer, there may be a case where the new version of modules for the software used by the user may be added between a time period when the list of modules to changed modules to be obtained or the list of added modules to be obtained is formed and the time set for obtaining the software. In addition, apart from the case of setting a timer, when the user does not do any operation on the monitor 406 after having formed a list of changed modules to be obtained or the list of added modules to be obtained, there may be a possibility that a new module may be added to the storing region until the time when he/she obtains the module by choosing a command "obtain the modules immediately". In such case, when the software is obtained based on such list of changed modules to be obtained or the list of added modules to be obtained, the newly added modules cannot be obtained. This leaves the user not being able to obtain the newly added modules until the next time he/she performs update operation which is inconvenient for the user who wishes to use the latest version of the software all the time.

Therefore, according to the present invention, the list of changed modules to be obtained or the list of added modules to be obtained can be re-formed when the user chooses "obtain the modules immediately" command or when the timer reaches the set time as the user computer accessing the module-storing regions 104 again, and modules can be re-obtained based on the re-formed list of modules.

FIG. 14 is a flow chart explaining such operation. According to the diagram, operation as in FIG. 12 is repeated and the list of changed modules to be obtained or the list of added modules to be obtained is re-formed after pressing the "obtain the modules immediately" or "setting a timing of obtaining thereof with a timer" command (Step 701).

With this configuration, the list of changed modules to be obtained or the list of added modules to be obtained is re-formed when actually obtaining the modules after forming the list of changed modules to be obtained or list of added modules to be obtained, for example, the modules that are added by the time of actual obtaining the modules as in a case where a module is added between a time period from the list of changed modules to be obtained or added modules to be obtained is formed and the time set by the timer can be obtained. This enables the real time, complete update.

In addition, in the above described embodiment, a topology that each of the user computers are connected with each other through LAN is explained, however, the embodiment of this invention is not limited to this type. For example, each of the user computers is capable of being started up linking with other computers even when the user computers are connected with each other through the Internet.

INDUSTRIAL APPLICABILITY

As explained above, according to the present invention, the software can be updated easily and efficiently and in the same time the load imposed on the information processing apparatus on the user side, the software vendors and the center computer side can be reduced.

BRIEF DESCRIPTION OF THE DRAWINGS

FIG. 7 is a flow chart showing a process necessary for the center computer 102 to update the software.

FIG. 8 is a flow chart showing a sequence of an action of the center computer 102 when the user computers 103 updates the software.

EXPLANATION OF CODES

Figure 1:
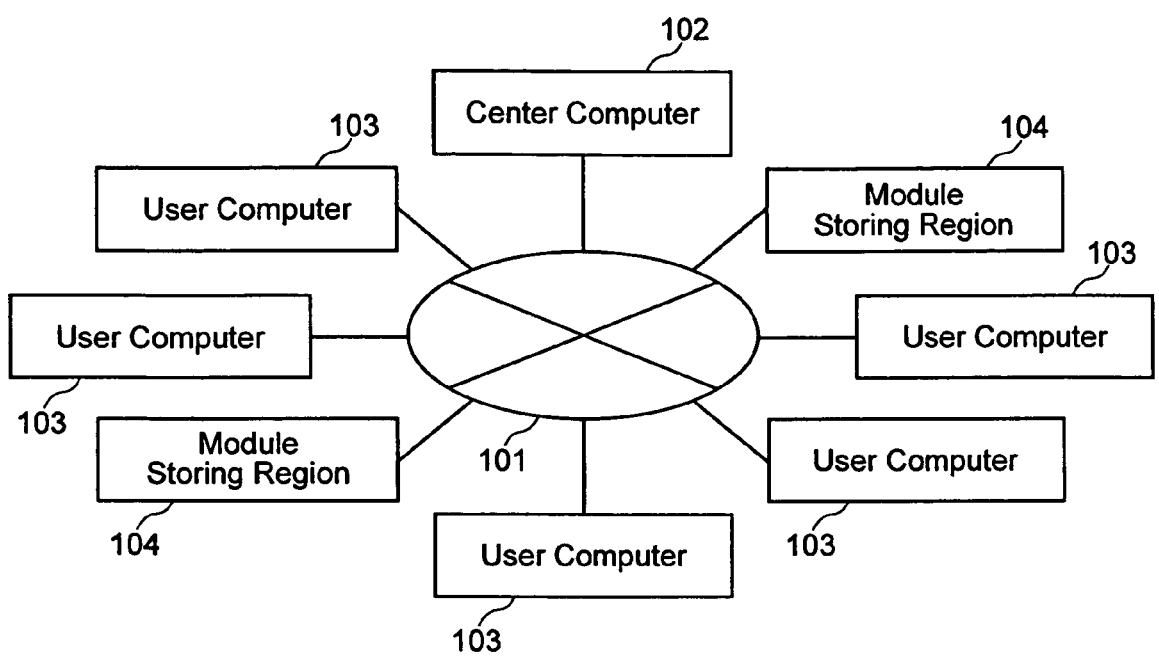
FIG. 1 is a sectional view showing overall structure of a container according to an embodiment of the present invention.
Figure 2:
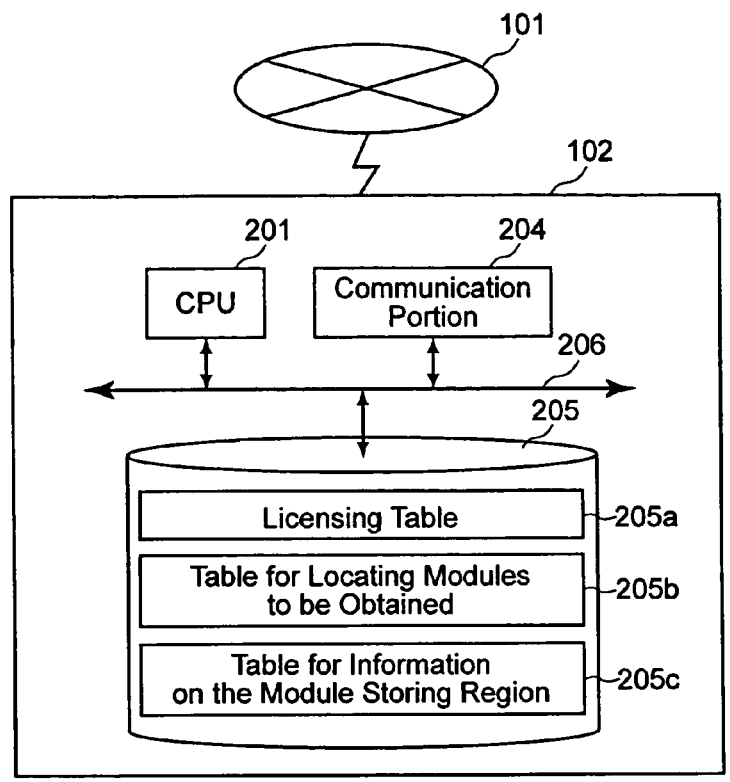
FIG. 2 is a diagram showing a structure of the center computer 102.
Figure 3:
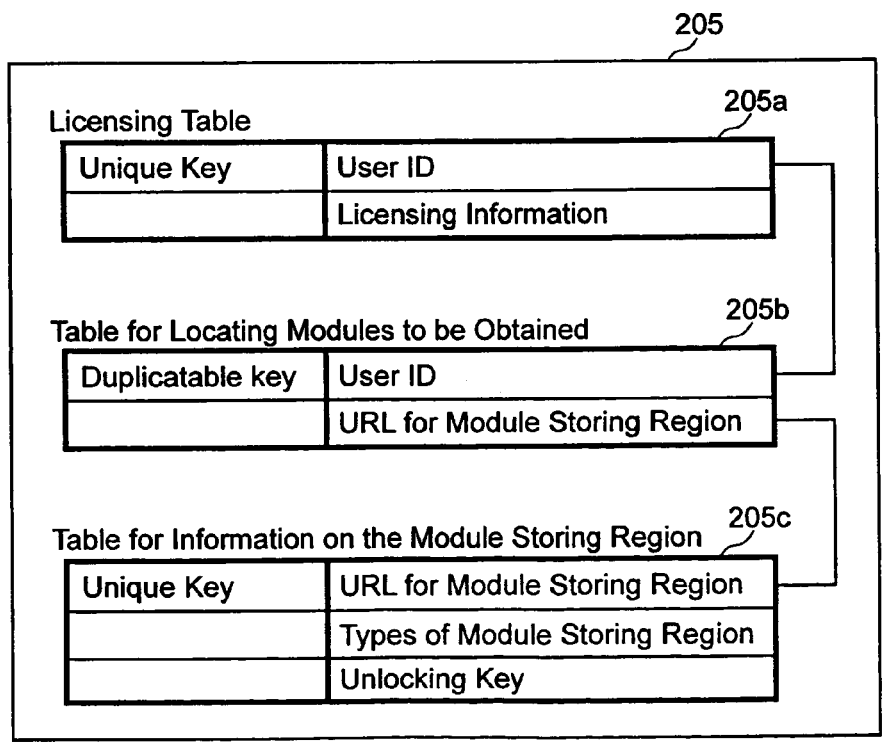
FIG. 3 is a diagram showing the contents of the licensing table 205a, the table 205b containing location information of update software and the table 205c of the information on the storing region of the modules.
Figure 4:
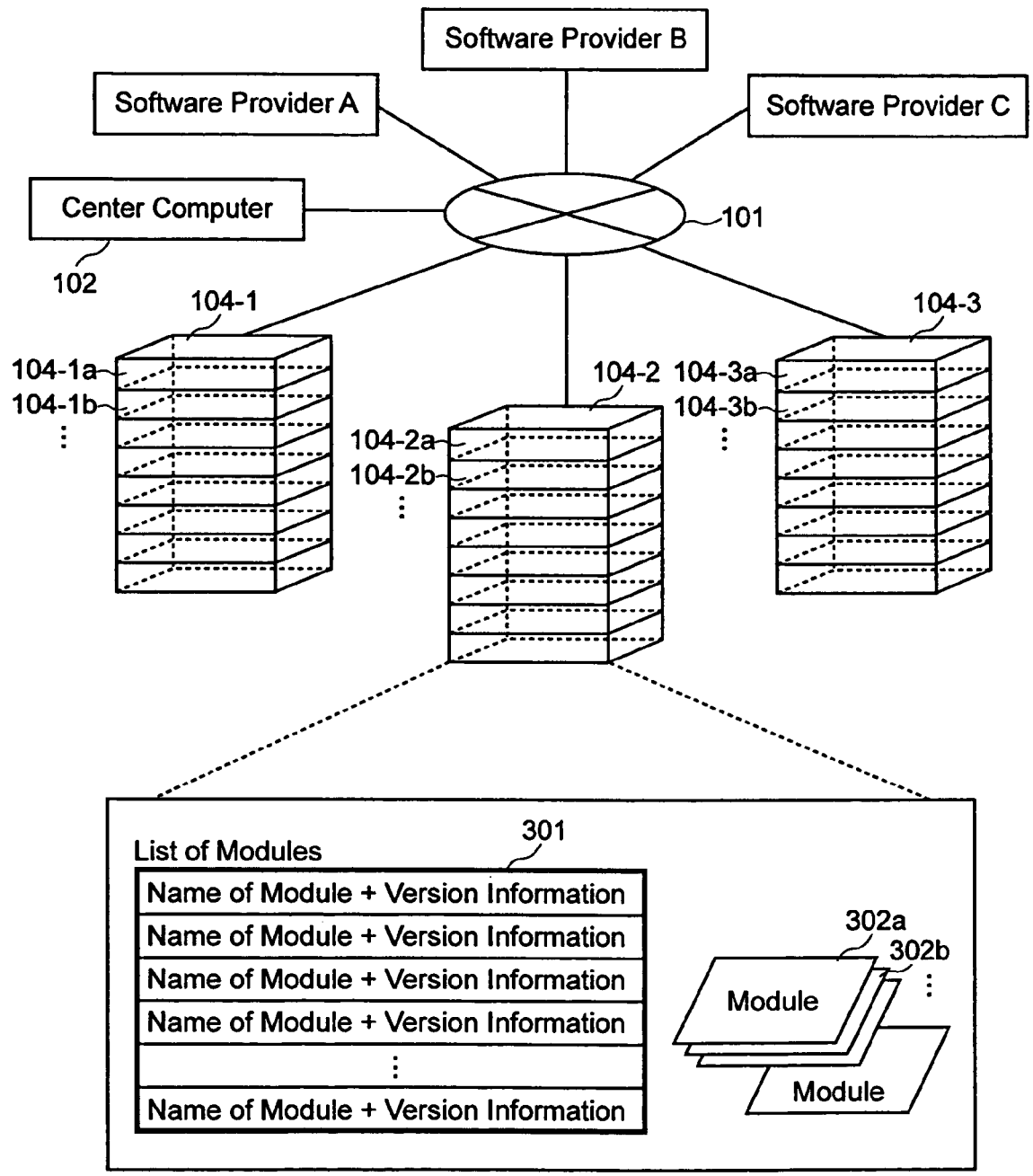
FIG. 4 is a diagram showing a structure of the module-storing regions 104.
Figure 5:
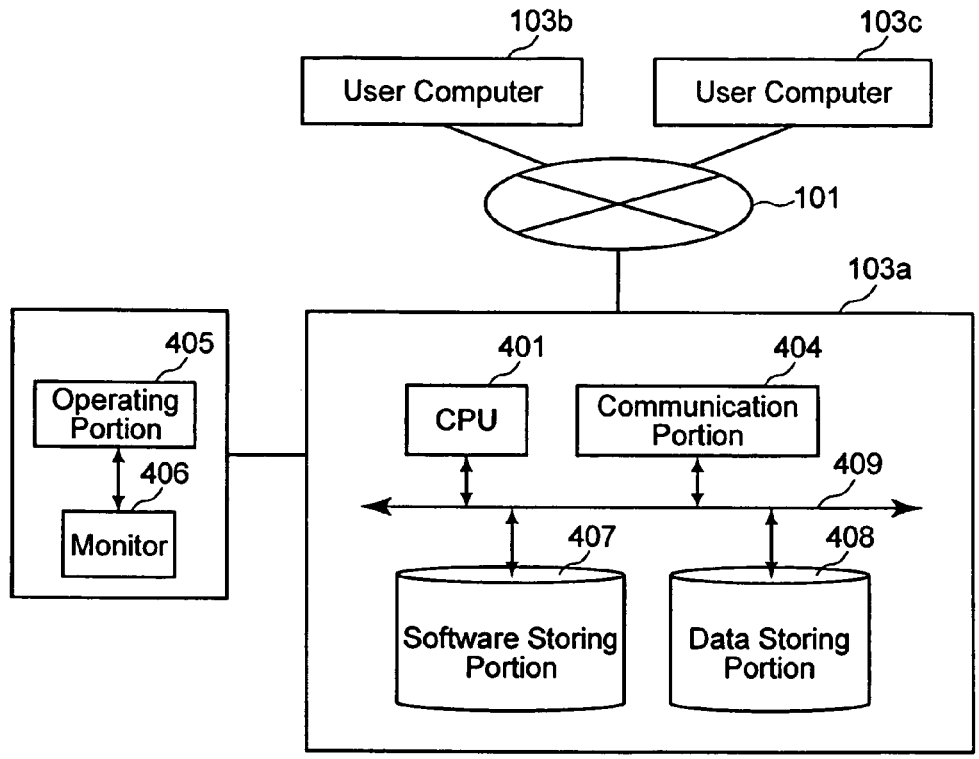
FIG. 5 is a diagram showing a structure of the user computers 103.
Figures 6A, 6B:
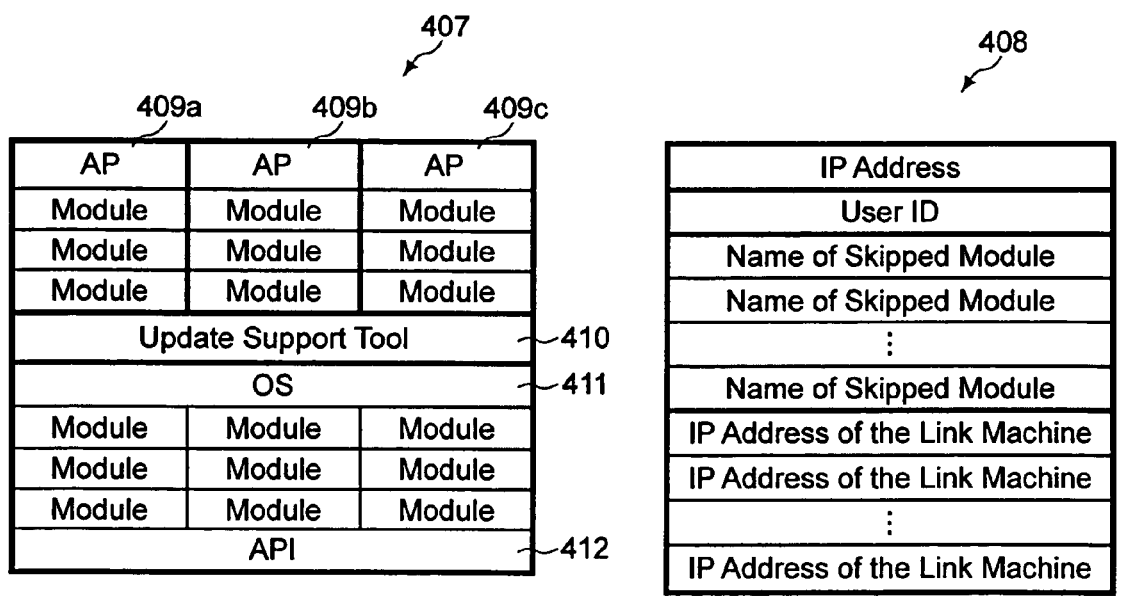
FIG. 6 is a diagram showing a structure of the software stored in the software-storing portion 407 and detailed structure of the data storing portion 408.
Figure 9:
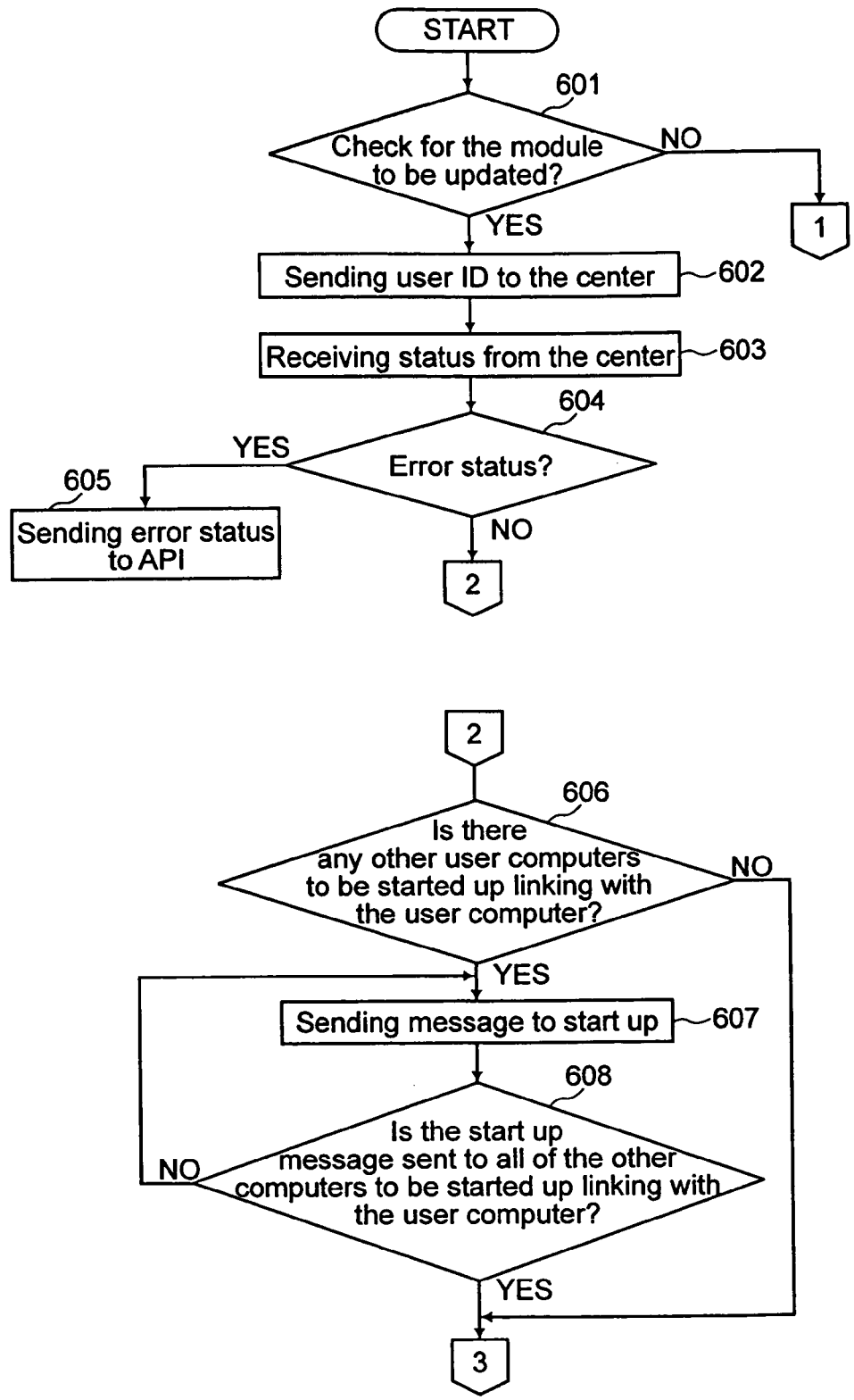
FIG. 9 is a flow chart showing a sequence of an action necessary for the user computers 103 to update the software.
Figure 10:
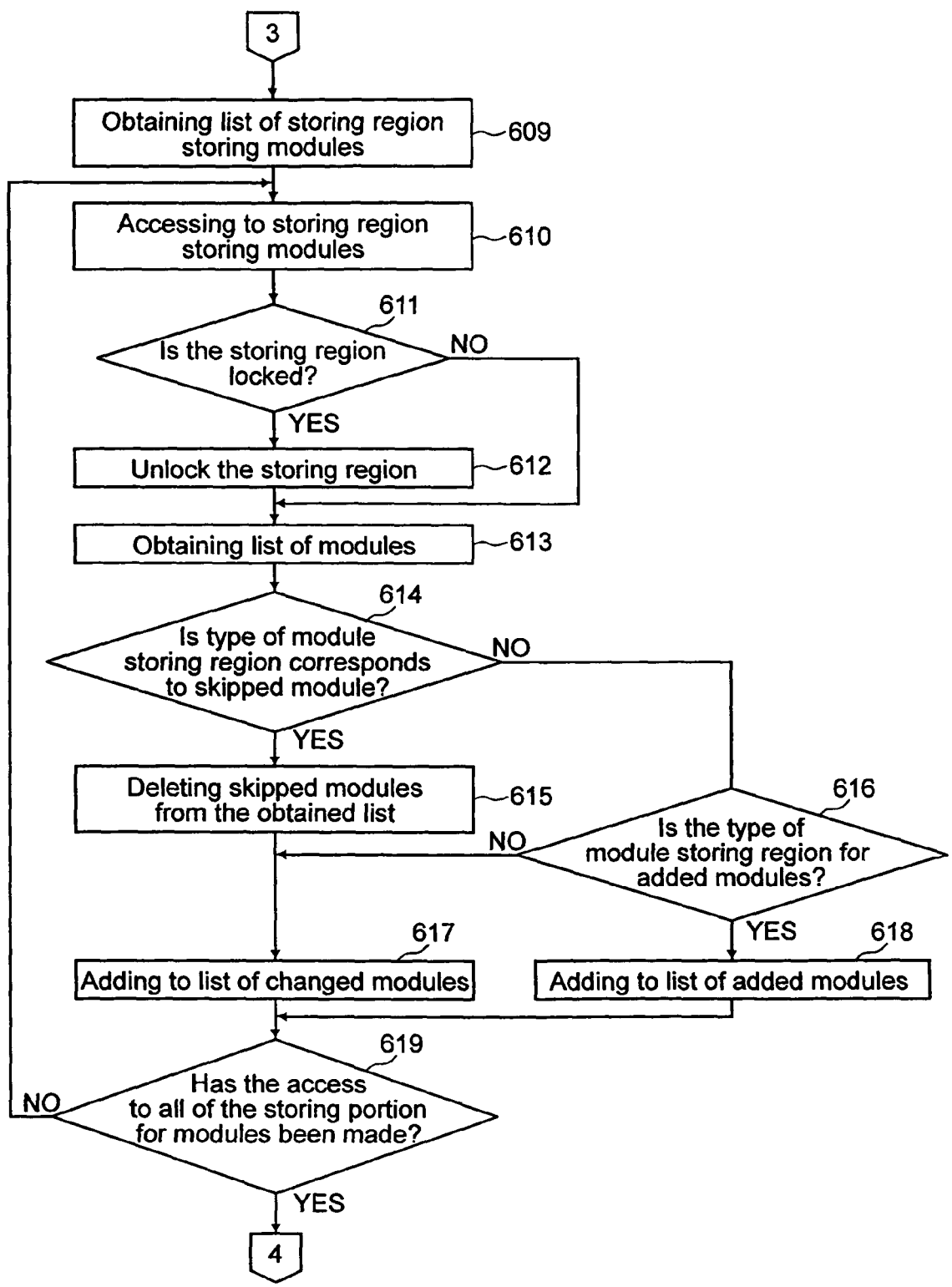
FIG. 10 is a flow chart continued from FIG. 9.
Figure 11:
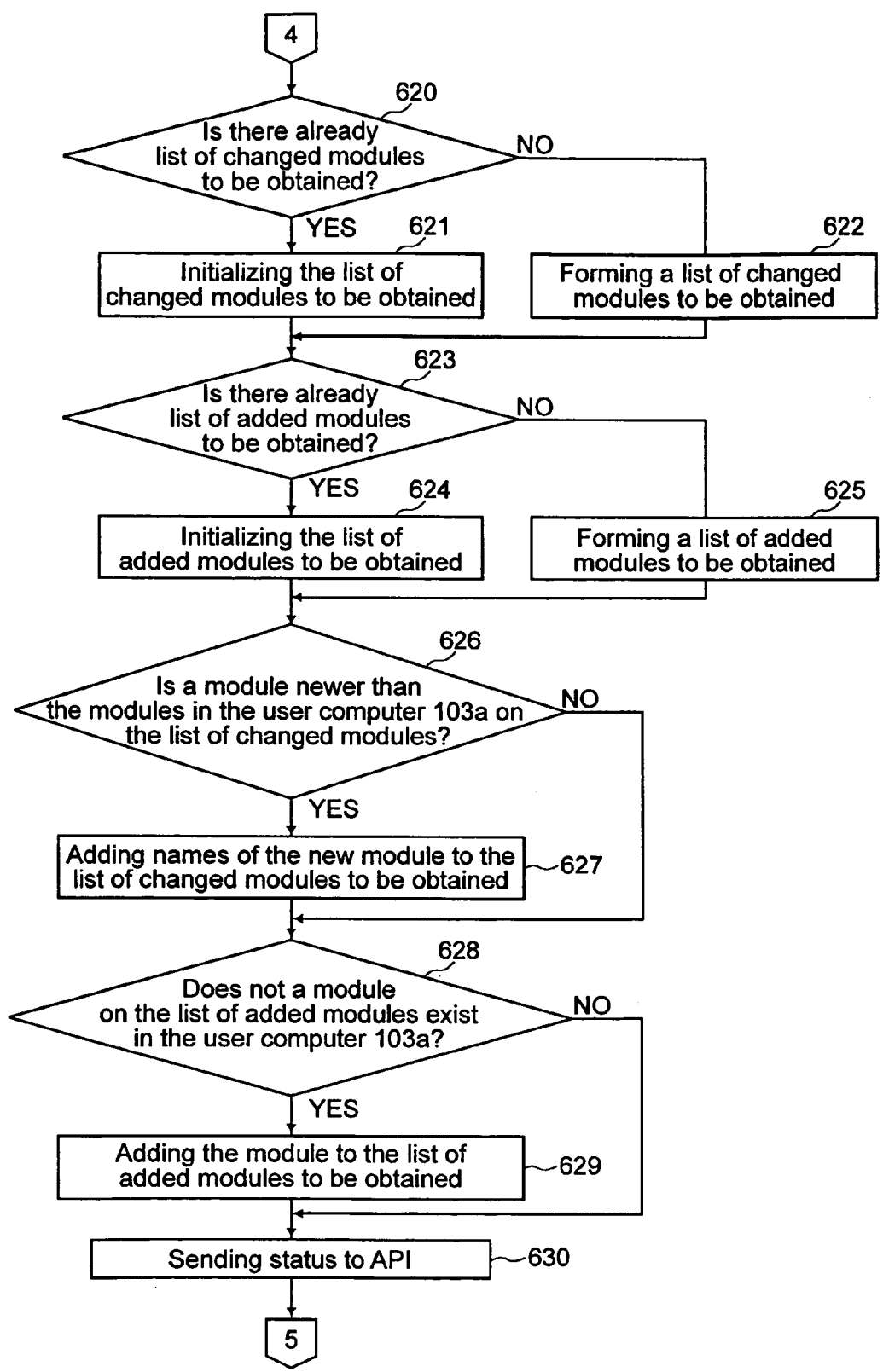
FIG. 11 is a flow chart continued from FIG. 10.
Figure 12:
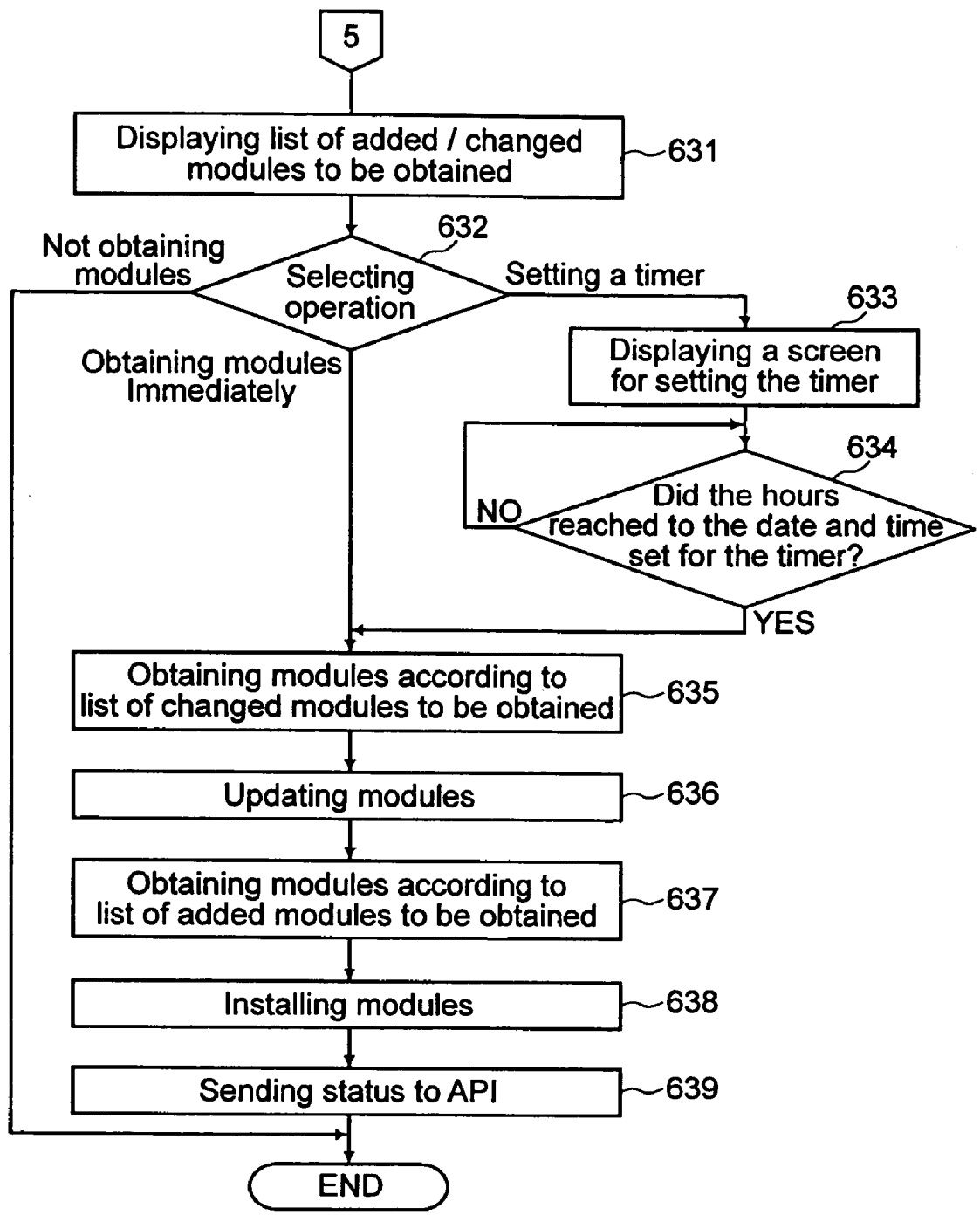
FIG. 12 is a flow chart continued from FIG. 11.
Figure 13:
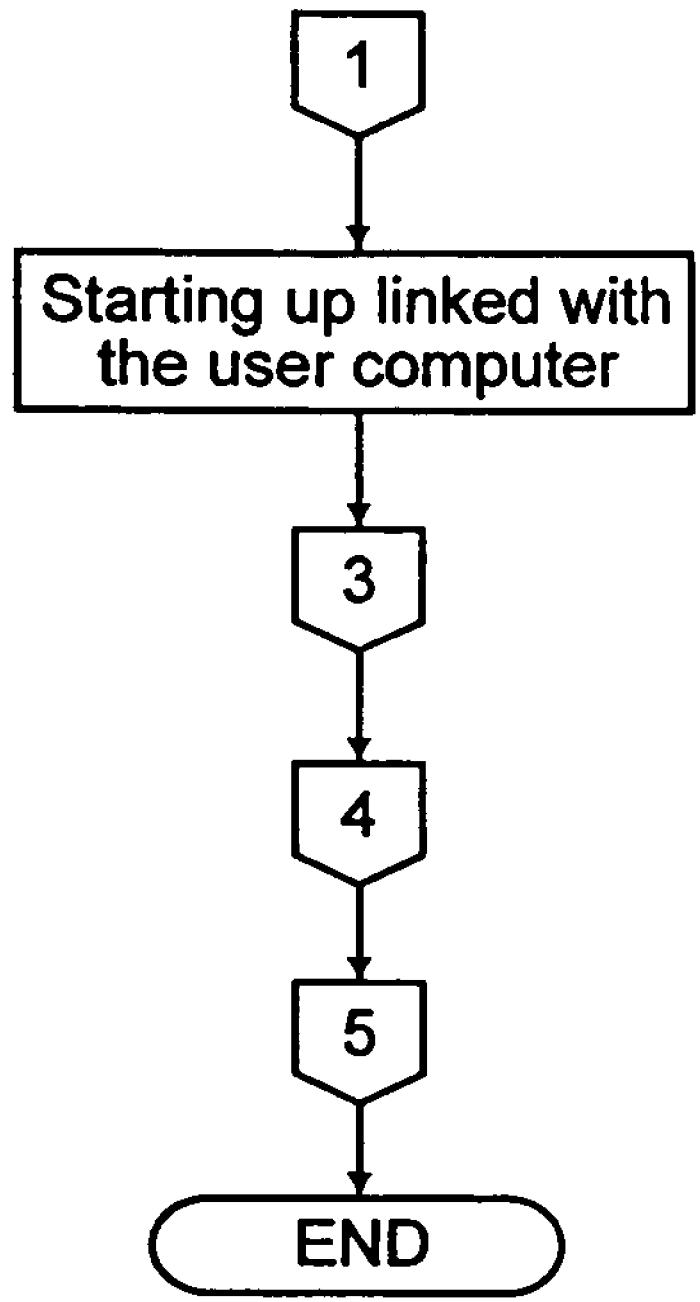
FIG. 13 is a flow chart showing a sequence of process when the user computer is started up triggered by another computer.
Figure 14:
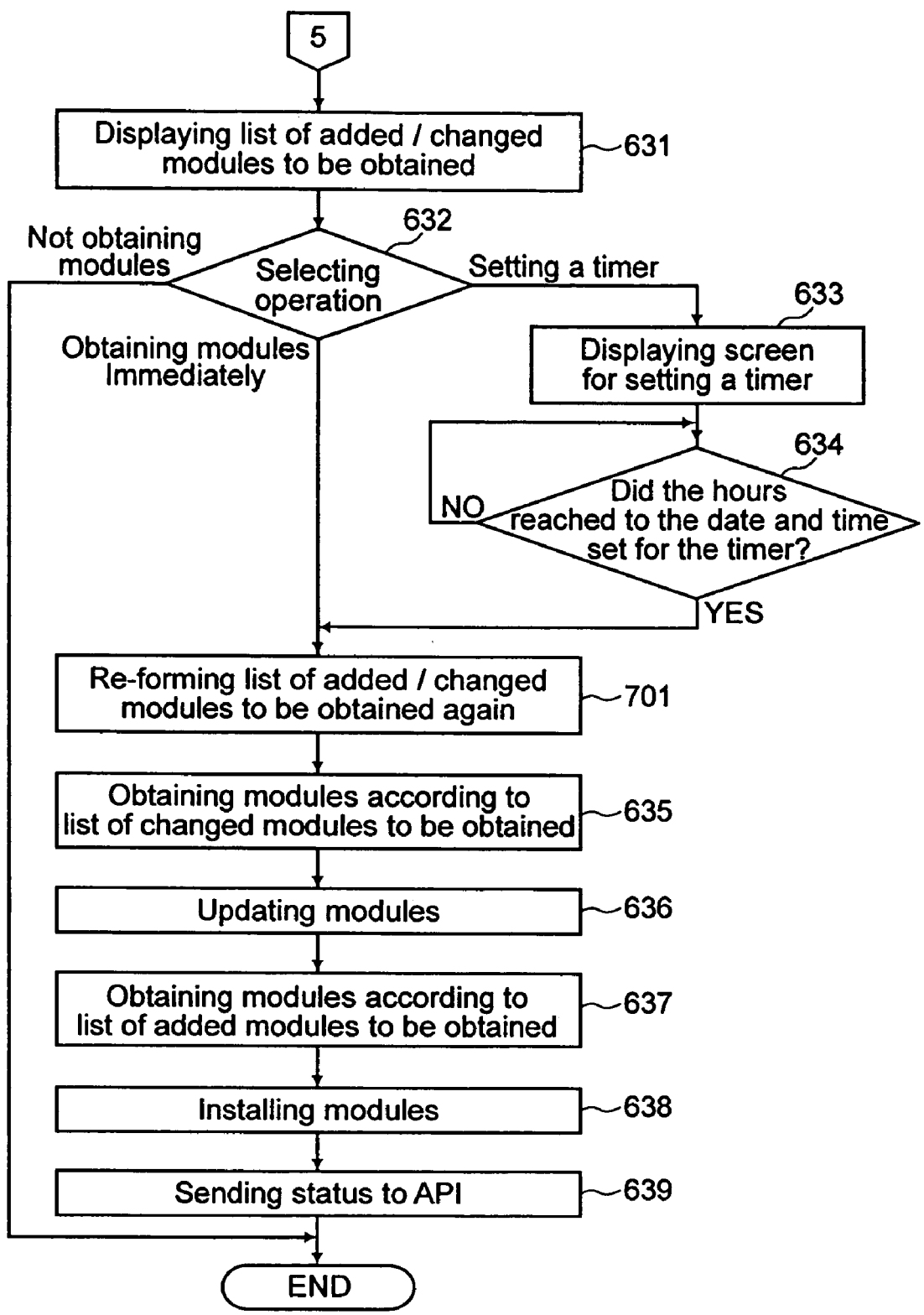
FIG. 14 is a flow chart showing a sequence of process when the update/additional module list is to be re-formed.

102 Center computer
103 User computer
104 Module-storing region
205a Licensing table
205b Table for locating modules to be obtained
205c Table for information on Module-storing region
301 List of modules
406 Monitor
410 Update support tool

What is claimed is:

1. An information processing apparatus comprising:
a user computer configured to obtain a list of modules from a module-storing region, a module identified in said list of modules being software; and
a center computer configured to generate location information identifying said module-storing region from a list of a plurality of module-storing regions,
wherein said user computer obtains said list of the plurality of module-storing regions from said center computer,
wherein said user computer obtains a list of new modules from said module-storing region when said list of new modules is absent from said user computer, said list of new modules being identified in said list of modules by said user computer comparing said list of modules and modules currently being installed in said user computer,
wherein said module-storing region is one of the plurality of the module-storing regions,
wherein said location information is recorded within said list of the plurality of module-storing regions,
wherein said user computer communicates with said module-storing region and said center computer over a network, said center computer communicating with said module-storing region over said network,
wherein said user computer sends user identification information onto said network, said user identification information identifying said user computer,
wherein said center computer compiles said list of the plurality of module-storing regions when said user computer is judged as having a license, said center computer using said user identification information in judging whether said user computer has said license, and
wherein said location information corresponds to each of the plurality of module-storing regions, said each of the plurality of module-storing regions being linked to said user identification information.

2. The information processing apparatus as set forth in claim 1, wherein said user computer obtains an updated module from said module-storing region when said updated module is a more recent version of a module stored in said user computer, said updated module being identified in said list of modules.

3. The information processing apparatus as set forth in claim 1, wherein said user computer deletes the name of a skipped module from said list of modules, said name of the skipped module being listed within said user computer.

4. The information processing apparatus as set forth in claim 1, wherein one of a plurality of user computers is a master machine, others of said plurality of user computers linking with said master machine.

5. The information processing apparatus as set forth in claim 4, wherein said user computer is from said plurality of user computers, an IP address of said master machine being stored within said user computer.

6. The information processing apparatus as set forth in claim 1, wherein said list of modules is updated when another of said list of modules is stored within said module-storing region, said list of modules being updated within said module-storing region.

7. The information processing apparatus as set forth in claim 1, wherein said location information includes a Uniform Resource Locator for each module-storing region in said list of the plurality of module-storing regions.

8. The information processing apparatus as set forth in claim 1, wherein said network is selected from the group consisting of a local area network, a wide area network and the Internet.

9. An information processing apparatus capable of communicating with a center computer through a network, comprising:
a processor;
a communication unit configured:
to send a user identification information for identifying a user of the information processing apparatus to the center computer;
to receive from the center computer a first list of a plurality of location information indicating locations of a plurality of storing regions and corresponding to the user identification information sent to the center computer, the plurality of storing regions being provided on the network to correspond to a plurality of user identification information of each of a plurality of users and storing a plurality of update software for a plurality of software provided by a plurality of software vendors to the plurality of users; and
to receive a plurality of second lists of the plurality of update software by accessing the plurality of storing regions according to the received first list; and a controller configured:
to determine whether there are any update software to be received by comparing the plurality of second lists and the software currently being installed in the information processing apparatus; and
to generate, when determined that there are some update software to be received, a third list of the update software to be received; and
the communication unit being further configured to receive the update software listed in the third list by accessing each of the plurality of storing regions storing the update software listed in the third list according to the received first list.

10. The information processing apparatus as set forth in claim 9, wherein:
the plurality of update software are a plurality of modules for updating software currently being installed in a plurality of information processing apparatuses of the plurality of users that are made to correspond to the plurality of storing regions; and
the controller is configured:
to compare a plurality of lists of modules received as the plurality of second lists from the plurality of storing regions and the plurality of modules that are currently being installed in the information processing apparatus and to generate, as the third list, a list of newer versions of the plurality of modules than the plurality of modules currently being installed in the information processing apparatus out of the plurality of second lists; and
to present the generated third list of the newer versions of the plurality of modules to the user and to input a command to receive newer versions of the plurality of modules; and
the communication unit is configured to receive the newer versions of the plurality of modules when the command to receive the newer versions of the plurality of modules thereof is inputted.

11. The information processing apparatus as set forth in claim 10, wherein:
the communication unit is configured to access the plurality of storing regions and to receive the plurality of second lists of modules, again by accessing the plurality of storing regions according to the received first list when the command to receive the newer versions of the plurality of modules is inputted;
the controller is configured to re-generate the third list of the newer versions of the plurality of modules according to the plurality of second lists received again; and
the communication unit is configured to receive the list of newer versions of the plurality of modules according to the re-generated third list of the newer versions of the plurality of modules.

12. The information processing apparatus as set forth in claim 10, wherein:
the communication unit is configured to access the plurality of storing regions and to receive the plurality of second lists again by accessing the plurality of storing regions according to the received first list when the command to receive the newer versions of the plurality of modules is inputted;
the controller is configured to re-generate the third list of the newer versions of the plurality of modules currently not being installed in the information processing apparatus according to the plurality of second lists received again; and
the communication unit is configured to receive the plurality of modules currently not being installed according to the re-generated third list of the newer versions of the plurality of modules.

13. The information processing apparatus as set forth in claim 9, wherein:
the plurality of update software are a plurality of modules that are currently not being installed and to be added in the information processing apparatus of the plurality of users and that are made to correspond to the plurality of storing regions;
the controller is configured:
to compare a plurality of lists of modules received as the plurality of second lists from the plurality of storing regions and the plurality of modules that are currently being installed in the information processing apparatus; and
to generate, as the third list, a list of modules that are currently not being installed in the information processing apparatus; and
to present the generated third list to the user and to input a command to receive the plurality of modules currently not being installed; and
the communication unit is configured to receive the plurality of modules currently not being installed in the information processing apparatus when the command to receive the plurality of modules currently not being installed is inputted.

14. The information processing apparatus as set forth in claim 9, further comprising:
a data storage configured to previously store a name of the software that is being excluded from the judgment of judging whether there are any update software to be received;
wherein the controller is configured to restrict updating software according to the stored name of the software.

15. The information processing apparatus as set forth in claim 9, wherein:
the information processing apparatus is capable of communicating with a link machine as a master machine through the network; and
the controller is configured to have the link machine compare the plurality of second lists received from the plurality of storing regions and the plurality of modules that is currently being installed in the information processing apparatus and determine whether there are any update software to be received, generate the third list when there are some update software determined to be received, access a storing region for each of the update software listed in the third list according to each of the plurality of location information of the received first list and receive the necessary update software from the plurality of storing regions.

16. A software updating system comprising:
a center computer; and
an information processing apparatus capable of communicating through a network, the center computer including:
a data storage configured to store a plurality of location information of a plurality of storing regions and a plurality of user identification information of each of a plurality of users, the plurality of storing regions being provided on the network to store a plurality of update software for a plurality of software provided to the plurality of users by a plurality of software vendors, and each of the plurality of user identification information corresponding to each of the plurality of storing regions;
a first communication unit configured:
to send previously the plurality of update software to the plurality of storing regions; and
to receive a user identification information from the information processing apparatus; and
a first controller configured to generate a first list of the plurality of location information corresponding to the received user identification information; and
the first communication unit being further configured to send the generated first list when the user identification information is received;
the information processing apparatus including:
a second communication unit configured:
to send the user identification information to the center computer;
to receive the generated first list; and
to receive a plurality of second lists of the plurality of update software by accessing the plurality of storing regions according to the generated first list; and
a second controller configured:
to determine whether there is any update software to be received by comparing the plurality of second lists and the software currently being installed in the information processing apparatus; and
to generate, when determined that there are some update software to be received, a third list of the update software to be received; and
the second communication unit being further configured to receive the update software listed in the third list by accessing each of the plurality of storing regions storing the update software listed in the third list according to the received first list.

17. A method of updating a software installed in an information processing apparatus capable of communicating with a center computer through a network, comprising:
sending a user identification information for identifying a user of the information processing apparatus to the center computer;
receiving from the center computer a first list of a plurality of location information indicating locations of a plurality of storing regions, the plurality of storing regions corresponding to the user identification information sent to the center computer, the plurality of storing regions being provided on the network to correspond to a plurality of user identification information of each of a plurality of users, and storing a plurality of update software for a plurality of software provided by a plurality of software vendors to the plurality of users;
accessing the plurality of storing regions according to the received first list and receiving a plurality of second lists of the plurality of update software from the plurality of storing regions;
determining whether there are any update software to be received by comparing the plurality of second lists and the software currently being installed in the information processing apparatus;
generating, when determined that there are some update software to be received, a third list of the update software to be received; and
receiving the update software listed in the third list by accessing each of the plurality of storing regions storing the update software listed in the third list according to the received first list.

18. A non-transitory computer-readable storage medium having embedded therein a computer program for carrying out a method of updating a software installed in an information processing apparatus capable of communicating with a center computer through a network, comprising:
sending a user identification information for identifying a user of the information processing apparatus to the center computer;
receiving from the center computer a first list of a plurality of location information indicating locations of a plurality of storing regions, the plurality of storing regions corresponding to the user identification information sent to the center computer, the plurality of storing regions being provided on the network to correspond to a plurality of user identification information of each of a plurality of users, and storing a plurality of update software for a plurality of software provided by a plurality of software vendors to the plurality of users;
accessing the plurality of storing regions according to the received first list and receiving a plurality of second lists of the plurality of update software from the plurality of storing regions;
determining whether there are any update software to be received by comparing the plurality of second lists and the software currently being installed in the information processing apparatus;
generating, when determined that there are some update software to be received, a third list of the update software to be received; and
receiving the update software listed in the third list by accessing each of the plurality of storing regions storing the update software listed in the third list according to the received first list.

* * * * *